(12) United States Patent
Komura et al.

(10) Patent No.: US 8,854,931 B2
(45) Date of Patent: Oct. 7, 2014

(54) POLARIZATION CONVERTER INCLUDING A JAGGED DIAGONAL LINE IN PLANE ORTHOGONAL TO PROPAGATION DIRECTION OF ELECTROMAGNETIC WAVE

(71) Applicant: TDK Corporation, Tokyo (JP)

(72) Inventors: Eiji Komura, Tokyo (JP); Tsutomu Chou, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/791,008

(22) Filed: Mar. 8, 2013

(65) Prior Publication Data
US 2014/0254333 A1  Sep. 11, 2014

(51) Int. Cl.
G11B 11/00 (2006.01)
H01P 3/16 (2006.01)
G11B 13/04 (2006.01)

(52) U.S. Cl.
CPC . H01P 3/16 (2013.01); G11B 13/04 (2013.01)
USPC .................. 369/13.33; 369/13.29; 369/13.13

(58) Field of Classification Search
CPC ................ G11B 2005/0021; G11B 2005/0032
USPC ...................... 369/13.33, 13.13, 13.32, 13.29
See application file for complete search history.

(56) References Cited

U.S. PATENT DOCUMENTS

| 5,061,037 | A | * | 10/1991 | Wong et al. ................... 385/11 |
| 5,341,449 | A | * | 8/1994 | Chikuma ...................... 385/122 |
| 5,539,845 | A | * | 7/1996 | van der Tol ................... 385/11 |
| 5,949,943 | A | * | 9/1999 | Watanabe et al. ............. 385/129 |
| 6,649,894 | B2 | | 11/2003 | Matsumoto et al. |
| 6,768,556 | B1 | | 7/2004 | Matsumoto et al. |
| 7,330,404 | B2 | | 2/2008 | Peng et al. |
| 7,715,668 | B2 | * | 5/2010 | Noda et al. .................... 385/14 |
| 8,393,074 | B1 | * | 3/2013 | Takayama et al. ........... 29/603.12 |
| 2007/0133638 | A1 | * | 6/2007 | Mizuuchi et al. ............ 372/50.11 |
| 2008/0147759 | A1 | * | 6/2008 | Fiorentino et al. ............ 708/250 |
| 2012/0213465 | A1 | * | 8/2012 | Fukuda ........................... 385/11 |

FOREIGN PATENT DOCUMENTS

JP  2010-088110 A  4/2010

OTHER PUBLICATIONS

Design of a new Ultra-small Polarization Converter in InGaAsP/InP membrane, Pello et al, COBRA Research Institute, Eindhoven University of T.technology (TUE), Apr. 9, 2010.*

* cited by examiner

*Primary Examiner* — Tan X Dinh
(74) *Attorney, Agent, or Firm* — Posz Law Group, PLC

(57) ABSTRACT

A polarization converter of the invention includes a core part that wave-guides an electromagnetic wave and a cladding part that is provided around the core part. The core part includes a conversion part converting a polarization state of the electromagnetic wave. A cross-sectional shape of the conversion part in a plane orthogonal to a propagation direction of the electromagnetic wave is a shape formed by cutting off a portion of a rectangular or square shape along a jagged diagonal line.

10 Claims, 8 Drawing Sheets

Prior Art

POLARIZATION CONVERTER INCLUDING A JAGGED DIAGONAL LINE IN PLANE ORTHOGONAL TO PROPAGATION DIRECTION OF ELECTROMAGNETIC WAVE

BACKGROUND OF THE INVENTION

1. Field of the Invention

The present invention relates to a polarization converter that has a dielectric waveguide and converts a polarization state of an electromagnetic wave to another polarization state.

2. Description of the Related Art

Currently, polarization converters are used in various applications. For example, a polarization converter is also used in a thermally-assisted magnetic head in which magnetic recording is assisted by heat.

JP 2010-088110 A discloses a polarization converter that uses a dielectric waveguide (see also FIGS. 1 and 2 of the present application). This polarization converter 90 has core parts 95a, 95b, 95c and a cladding part (not illustrated) covering around the core parts 95a, 95b, 95c. The core parts 95a, 95b, 95c have a substantially cuboidal shape, and a portion of the core part 95c is obliquely cut off in such a manner that an inclined surface 96 appears. The portion 95c (referred to as the asymmetric core part in the following) having the inclined surface 96 is a conversion part that converts the polarization state of an electromagnetic wave. An electromagnetic wave is incident onto the incident side core part 95a, passes through the asymmetric core part 95c, and is emitted from the emitting side core part 95b.

When the electromagnetic wave is incident onto the asymmetric core part 95c, two polarization modes in diagonal directions that are orthogonal to each other are generated. Because of the asymmetry of a cross-sectional shape of the asymmetric core part 95c, a propagation constant (wave number) $\beta_1$ of an electromagnetic wave of a first mode and a propagation constant (wave number) $\beta_2$ of an electromagnetic wave of a second mode are different. Because of the difference in the propagation constants, as the electromagnetic waves propagate, a phase difference between the electromagnetic waves of the two modes increases. As a result, as an electromagnetic wave propagates through the asymmetric core part 95c, the polarization state of the electromagnetic wave changes.

The larger the difference $(\beta_1 - \beta_2)$ in the propagation constants is, the larger the phase difference of the electromagnetic waves becomes. Therefore, in order to shorten a length (converter length) of the asymmetric core part 95c along a propagation direction of the electromagnetic wave, it is necessary to increase the difference in the propagation constants. In order to increase the difference in the propagation constants, it is sufficient to increase the asymmetry of the cross-sectional shape of the asymmetric core part 95c, that is, to reduce the cross-sectional area of the asymmetric core part 95c. However, in this case, at a boundary between the input side core part 95a and the asymmetric core part 95c, and at a boundary between the asymmetric core part 95c and the output side core part 95b, coupling efficiency of the electromagnetic wave decreases, and as a result, use efficiency of the electromagnetic wave decreases. The decrease in the coupling efficiency is caused by an increase in a difference between a light distribution of the asymmetric core part 95c and light distributions of the incident side and emitting side core parts 95a, 95b.

As described above, it is difficult to increase the coupling efficiency of the electromagnetic wave while reducing the converter length. Therefore, a polarization converter is desired that allows the coupling efficiency to be improved, in particular allows the coupling efficiency to be improved without significantly increasing the converter length.

SUMMARY OF THE INVENTION

A polarization converter of the invention includes a core part that wave-guides an electromagnetic wave and a cladding part that is provided around the core part. The core part includes a conversion part converting a polarization state of the electromagnetic wave. A cross-sectional shape of the conversion part in a plane orthogonal to a propagation direction of the electromagnetic wave is a shape formed by cutting off a portion of a rectangular or square shape along a jagged diagonal line.

The inventor of the present application discovered that, with a converter having a cross-sectional shape having a jagged diagonal line, a coupling efficiency of an electromagnetic wave improves at an input side boundary and an output boundary of the converter. Specifically, by reducing a surface roughness of the jagged diagonal line, the coupling efficiency improves even when a converter length is not large very much.

The above and other objects, features and advantages of the invention will be disclosed from detailed descriptions below referring to the attached figures in which the invention is exemplarily illustrated.

DETAILED DESCRIPTION OF THE INVENTION

Figure 3:
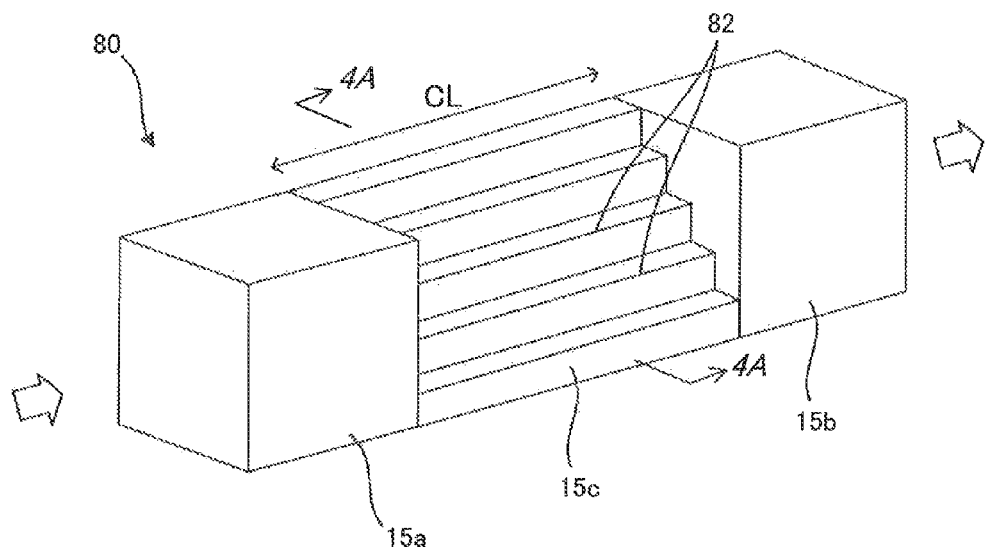
FIG. 3 is a schematic perspective view of a polarization converter according to an embodiment of the present invention.
Figure 4:
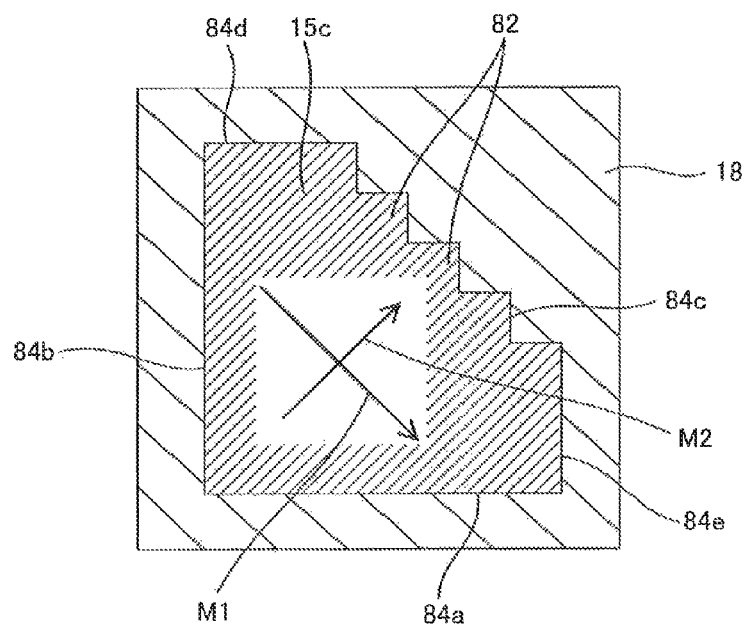
FIG. 4 is a cross-sectional view along a 4A-4A line of FIG. 3.

FIG. 3 is a schematic perspective view of a polarization converter of the present invention. FIG. 4 is a cross-sectional view along a 4A-4A line of FIG. 3. A polarization converter 80 is configured from a dielectric waveguide. The polarization converter 80 has core parts 15a, 15b, 15c that wave-guide an electromagnetic wave and a cladding part 18 that is arranged around the core parts 15a, 15b, 15c. A refractive index of the cladding part 18 is smaller than a refractive index of the core parts 15a, 15b, 15c. In FIG. 3, for convenience, the cladding part is not illustrated.

The core parts include an incident side core part 15a, an asymmetric core part (conversion part) 15c, and an emitting side core part 15b. An electromagnetic wave sequentially passes through the incident side core part 15a, the conversion part 15c and the emitting side core part 15b. In the conversion part 15c, a polarization state of the electromagnetic wave is converted.

The incident side core part 15a, the conversion part 15c and the emitting side core part 15b are integrally formed with a same dielectric material. Alternatively, the incident side core part 15a, the conversion part 15c and the emitting side core part 15b may also be respectively formed from any dielectric materials that are different from each other. For example, the core parts 15a, 15b, 15c can be formed from silicon dioxide ($SiO_2$) and alumina ($Al_2O_3$). The cladding part can be formed from, for example, tantalum oxide, titanium oxide, and the like.

It is preferable that the incident side core part 15a and the emitting side core part 15b have a square shape in a cross section orthogonal to the propagation direction of the electromagnetic wave.

A cross-sectional shape of the conversion part 15c in a cross section orthogonal to the propagation direction of the electromagnetic wave is a shape formed by cutting off a portion of a rectangular shape, or preferably a square shape, along a jagged diagonal line 84c. Specifically, in the cross section, a contour of the conversion part 15c has a linear horizontal side 84a, a linear vertical side 84b that is orthogonal to the horizontal side 84a, and a jagged diagonal line 84c that has a plurality of teeth 82 (see FIG. 4). The jagged diagonal line 84c extends from a second horizontal side 84d that opposes the horizontal side 84a toward a second vertical side 84e that opposes the vertical side 84b. Alternatively, the cross section of the conversion part 15c may have a substantially right-angled triangular cross section that is formed from the horizontal side 84a, the vertical side 84b and the jagged diagonal line 84c.

In FIG. 4, the jagged diagonal line 84c having three teeth 82 is illustrated. However, in practice, the jagged diagonal line 84c may be a jagged diagonal line having a large number of small teeth. The conversion part 15c having the plurality of the teeth 82 can be formed by using methods such as wet etching and polishing.

It is preferable that, in the cross section orthogonal to the propagation direction of the electromagnetic wave, each of the teeth 82 is formed to have a right angle. That is, the tooth 82 may have a side in a horizontal direction substantially parallel to the horizontal side 84a that forms the contour of the conversion part 15c and a side in a vertical direction substantially parallel to the vertical side 84b that forms the contour of the conversion part 15c. It is preferable that, in each tooth 82, a length R1 of the side in the horizontal direction and a length R2 of the side in the vertical direction are substantially equal (see also FIG. 5). However, the shape of the tooth 82 is not limited to this; the tooth 82 may adopt various shapes.

Next, an operation principle of the polarization converter 80 is explained. An electromagnetic wave entering the input side core part 15a is decomposed at the asymmetric core part 15c into a first mode M1 and a second mode M2 that have oblique polarization axes as illustrated in FIG. 4. Here, electromagnetic waves of the two modes M1, M2 are excited at nearly equal phases and equal amplitudes.

Because of the asymmetry of the cross-sectional shape of the conversion part 15c, a propagation constant (wave number) β1 of the electromagnetic wave of the first mode M1 and a propagation constant (wave number) β2 of the electromagnetic wave of the second mode M2 are different. In other words, an effective refractive index of the first mode and an effective refractive index of the second mode are different.

Depending on this difference in the effective refractive indices, that is, the difference in the propagation constants, the electromagnetic waves in the conversion part 15c propagate with difference speeds. In other words, as the electromagnetic waves propagate through the conversion part 15c, the difference in the phases of the electromagnetic waves of the two modes M1, M2 increases. When a length (converter length: CL) of the conversion part 15c along the propagation direction of the electromagnetic waves is set to be "CL=π/(β1−β2)," at a boundary between the conversion part 15c and the output side core part 15b, the phases of the electromagnetic wave of the first mode and the electromagnetic wave of the second mode are reversed. As a result, a polarization plane of an output electromagnetic wave is in a state of being rotated 90 degrees with respect to a polarization plane of an input electromagnetic wave.

Therefore, when an electromagnetic wave of a horizontal polarization mode (TE mode) is input to the input side core part 15a, an electromagnetic wave of a vertical polarization mode (TM mode) is output. Conversely, when an electromagnetic wave of the TM mode is input to the input side core part 15a, an electromagnetic wave of the TE mode is output.

Further, when the converter length is set to be "CL=π/{2×(β1−β2)}," at the boundary between the conversion part 15c and the output side core part 15b, the electromagnetic wave of the first mode and the electromagnetic wave of the second mode have a phase difference of 90 degrees. Therefore, a polarization converter is obtained that converts a circular polarization to a linear polarization or a linear polarization to a circular polarization.

Figure 1:
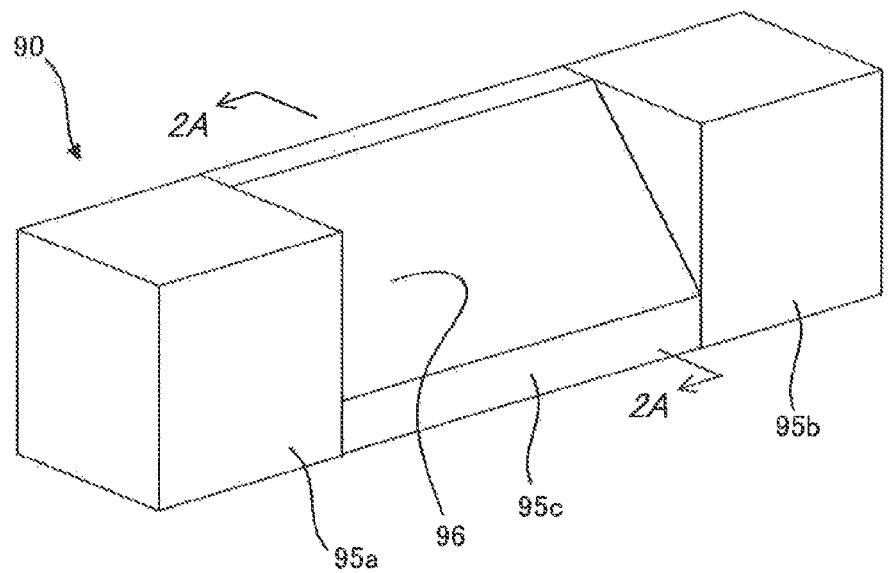
FIG. 1 is a schematic perspective view of a conventional polarization converter.
Figure 2:
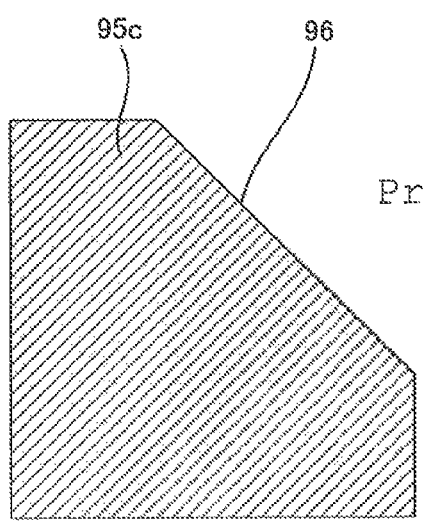
FIG. 2 is a cross-sectional view along a 2A-2A line of FIG. 1.
Figure 5:
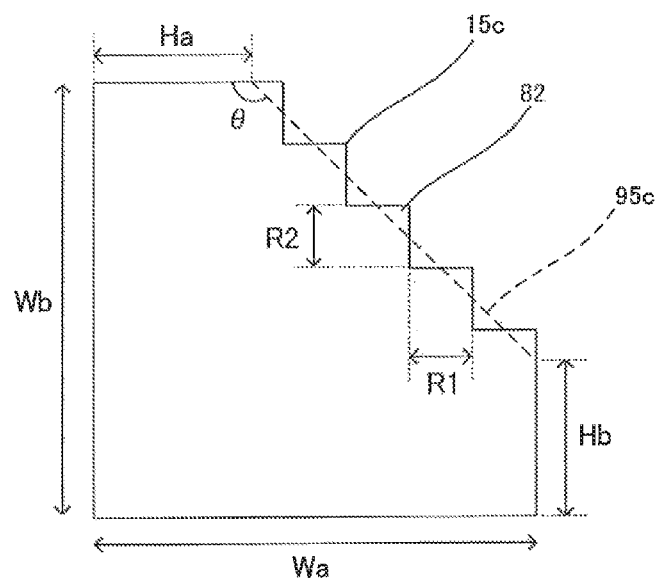
FIG. 5 compares a cross section of a conversion part of a polarization converter of a comparative example and a cross section of a conversion part of the polarization converter of the embodiment of the present invention.

Next, simulation results are explained that compare the polarization converter 90 of a comparative example illustrated in FIG. 1 and the polarization converter 80 of the embodiment of the present invention illustrated in FIG. 3. FIG. 5 compares sizes of the conversion part 95c of the polarization converter 90 of the comparative example and sizes of the conversion part 15c of the polarization converter 80 of the embodiment.

In the conversion part 95c of the comparative example, a width Wa of the horizontal side 84a and a width Wb of the vertical side 84b are 350 nm. A width Ha of a side that is adjacent to the vertical side 84b and parallel to the horizontal side 84a is 100 nm. A width Hb of a side that is adjacent to the horizontal side 84a and parallel to the vertical side 84b is 100 nm. Angles θ between these sides Ha, Hb and an oblique side 96 are 135 degrees.

The refractive indices of the incident side core part 95a, the conversion part 95c and the emitting side core part 95b are 2.1, considering tantalum oxide ($TaO_x$). Further, the refractive index of the cladding part is 1.45, considering silicon dioxide ($SiO_2$).

In the conversion part 15c of the polarization converter 80 of the embodiment of the present invention, as illustrated in FIG. 5, except the jagged diagonal line, shape and sizes are set to be the same as those of the comparative example. Further, as illustrated in FIG. 5, the position of the jagged diagonal line is determined in such a manner that cross-sectional areas of the conversion parts in the comparative example and the embodiment are the same.

Figure 6:
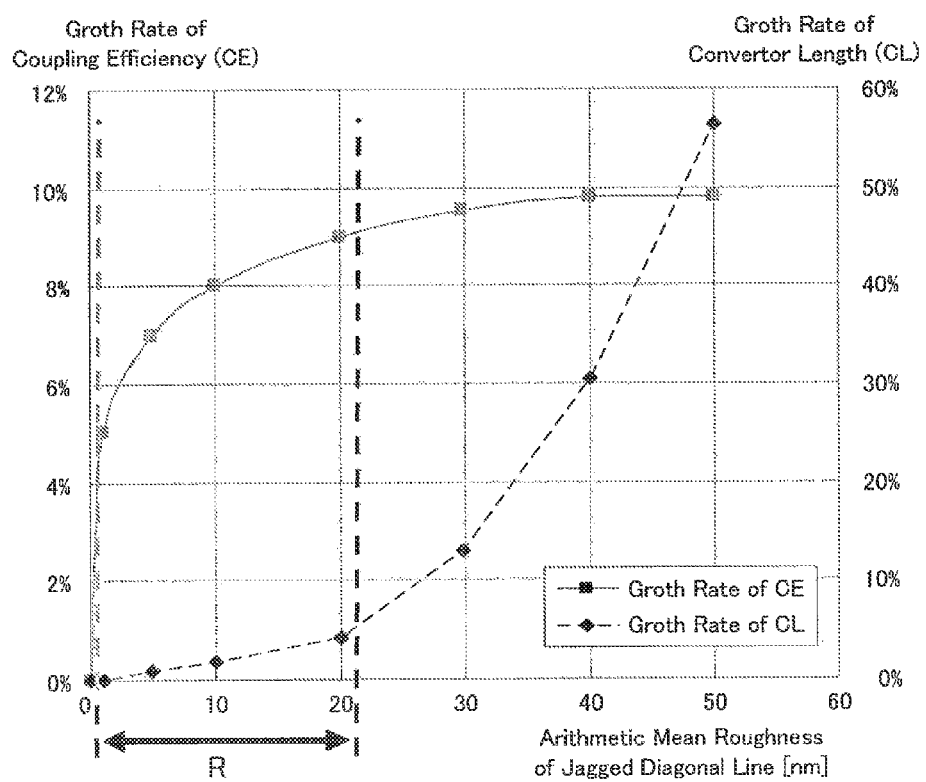
FIG. 6 is a graph illustrating relations between coupling efficiency and converter length of a conversion part and a surface roughness of a jagged diagonal line.

FIG. 6 is a graph illustrating simulation results of the coupling efficiency and the converter length. For the polarization converter 80 of the embodiment, the simulation is performed by changing a value of a surface roughness (arithmetic mean roughness: Ra) of the jagged diagonal line 84c. The coupling efficiency illustrated in the graph is a coupling efficiency of an electromagnetic wave at a boundary between the incident side core part and the conversion part (asymmetric core part). In the present simulation, an electromagnetic wave of the TE mode having a wavelength of 950 nm is incident onto the incident side core part.

In the graph, the coupling efficiency and the converter length in the embodiment are illustrated as growth rates from the coupling efficiency and the converter length in the comparative example. That is, "0%" indicates a value of the coupling efficiency or the converter length of the comparative example. Based on the above condition, to convert an electromagnetic wave of the TE mode to an electromagnetic wave of the TM mode, the converter length of the polarization converter of the comparative example is 11.5 μm.

The smaller the value of the arithmetic mean roughness Ra of the jagged diagonal line is, the more the growth rate of the converter length decreases. This is because the smaller is the value of the arithmetic mean roughness Ra of the jagged diagonal line, the smaller is the difference between the effective refractive index of the first mode and the effective refractive index of the second mode in the conversion part 15c. Therefore, the smaller is the arithmetic mean roughness Ra of the jagged diagonal line, the smaller the polarization converter can be obtained.

On the other hand, due to the jagged diagonal line of the conversion part 15c, the coupling efficiency of the electromagnetic wave is improved. This is believed to be due to that the tail of the light distribution of the conversion part 15c is broadened in a plane perpendicular to the propagation direction of the electromagnetic wave due to the jagged diagonal line, and a degree of matching between light distributions of the incident side core part 15a and the emitting side core part 15b is increased. Further, the larger the arithmetic mean roughness Ra of the jagged diagonal line is, the more the coupling efficiency increases. This is believed to be due to that, as the arithmetic mean roughness Ra of the jagged diagonal line increases, intensity of the electromagnetic wave in the conversion part 15c entirely increases.

Here, in a region where the arithmetic mean roughness Ra of the jagged diagonal line 84c is small, the converter length slightly increases, while the coupling efficiency rapidly increases. Therefore, when the arithmetic mean roughness Ra of the jagged diagonal line is small, it is possible to increase the coupling efficiency while suppressing the increase in the size of the polarization converter.

In a particularly preferable case, that is, in a case where the growth rate of the converter length is 5% or less and the growth rate of the coupling efficiency is 5% or more, the arithmetic mean roughness Ra of the jagged diagonal line is 1 nm or more and 21 nm or less (see a range R in the graph). That is, when the arithmetic mean roughness Ra of the jagged diagonal line is 1 nm or more and 21 nm or less, a particularly significant effect is induced with respect to the comparative example.

Figure 7:
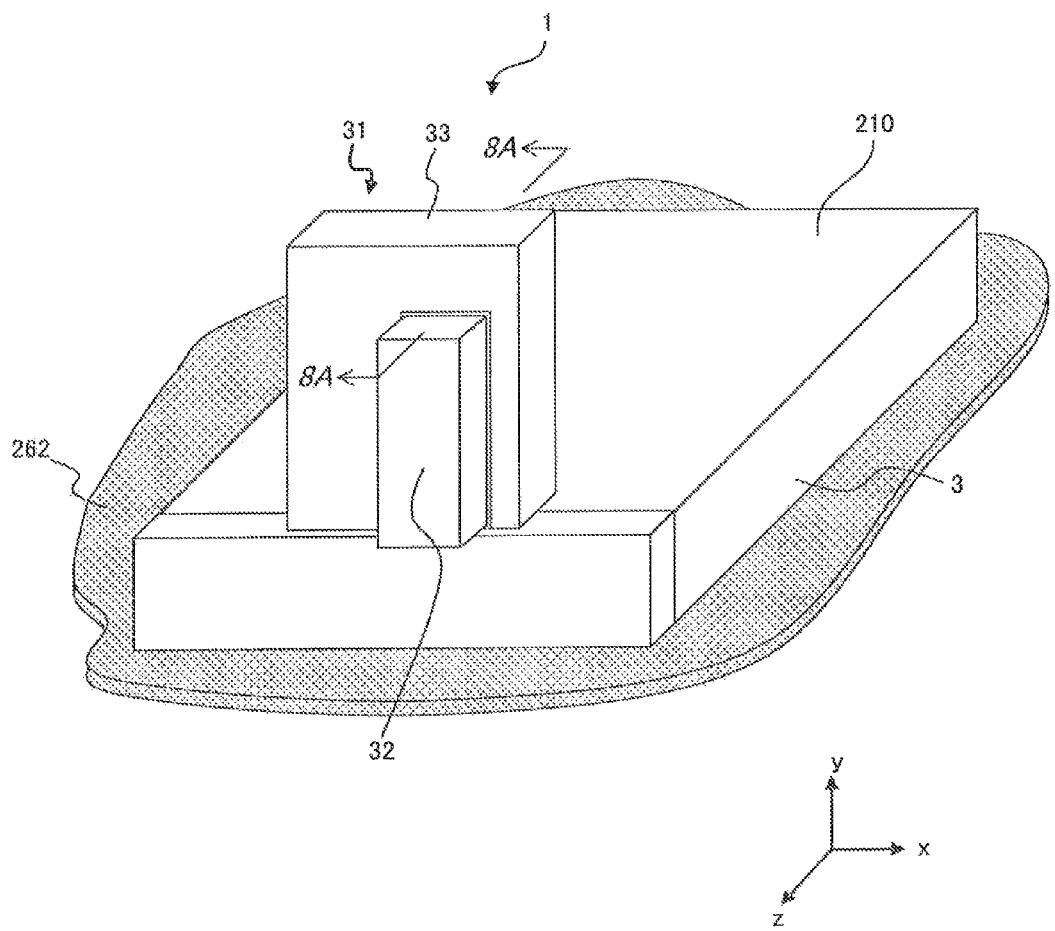
FIG. 7 is a schematic perspective view of a thermally-assisted magnetic head.
Figure 8:
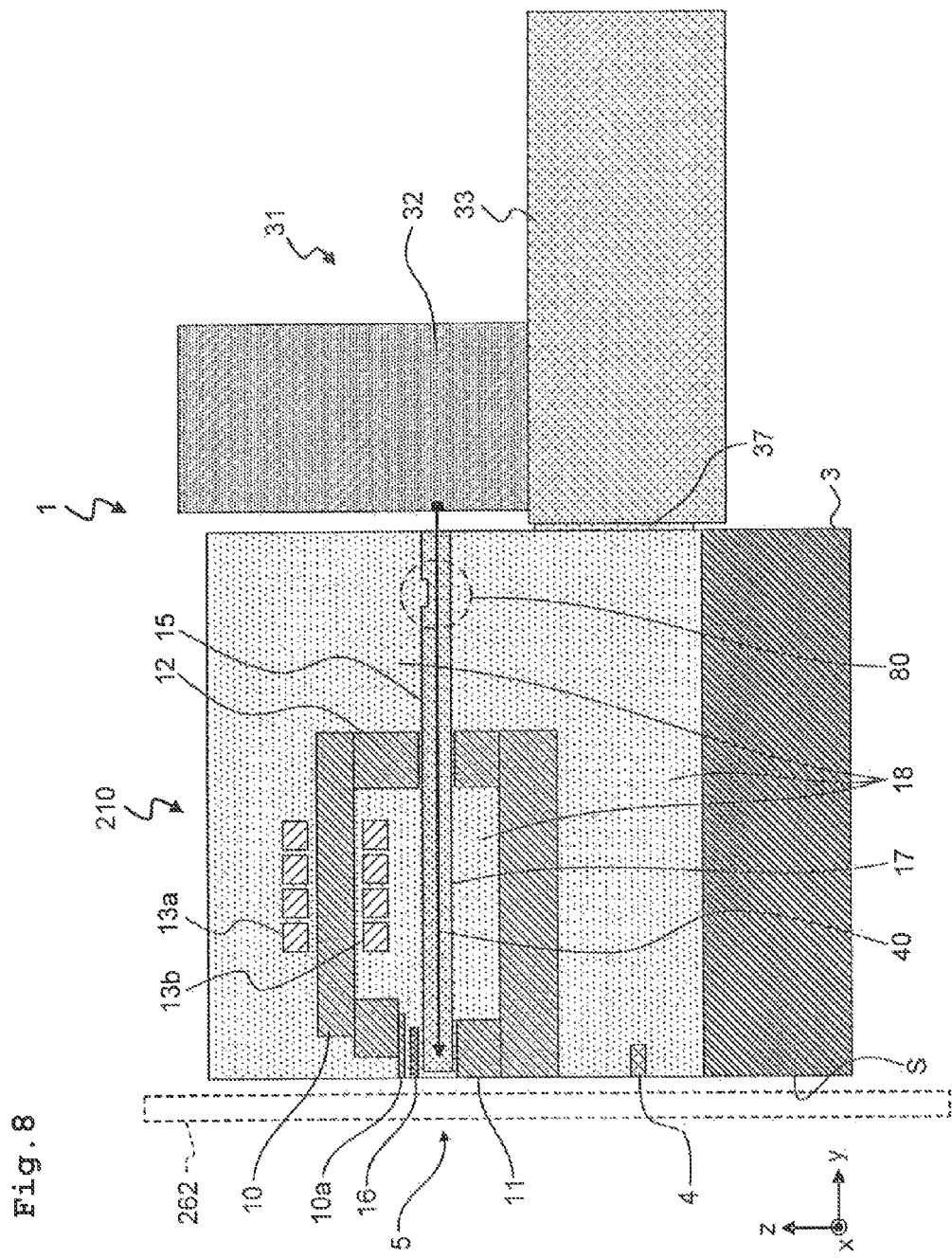
FIG. 8 is a schematic cross-sectional view along an 8A-8A line of FIG. 7.

Next, an example of a thermally-assisted magnetic head having the above-described polarization converter is explained. FIG. 7 is a schematic perspective view of a thermally-assisted magnetic head according to an embodiment. FIG. 8 is a schematic cross-sectional view along an 8A-8A line of FIG. 7.

Figure 9:
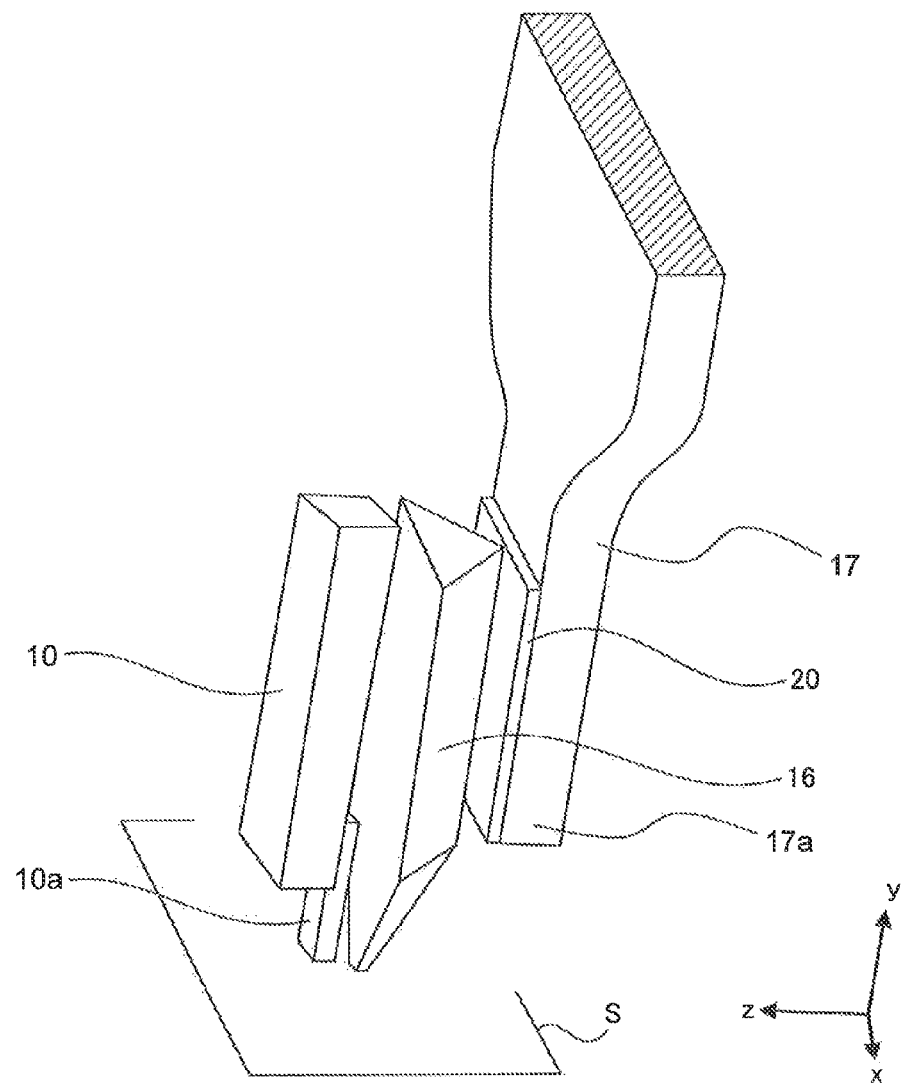
FIG. 9 is a schematic perspective view illustrating a configuration in the vicinity of a magnetic pole, a waveguide and a plasmon generator in a magnetic head.

A thermally-assisted magnetic head 1 includes a slider 210, and a laser diode unit 31 that is fixed on the slider 210 and emits laser light. The slider 210 has a nearly hexahedral shape. One surface of the hexahedron forms a recording medium opposing surface (air bearing surface) S that opposes a magnetic recording medium 262. The slider 210 includes an MR element 4 that configures a reading head part, a recording element 5 that configures a recording head part, a waveguide 17, and a plasmon generator 16. FIG. 9 is a schematic perspective view illustrating a configuration in the vicinity of a magnetic pole 10, the waveguide 17 and the plasmon generator 16.

By using a property that electrical resistance changes in response to an external magnetic field, the MR element 4 can detect the external magnetic field, that is, magnetic information recorded in the magnetic recording medium 262. The MR element 4, the magnetic recording element 5, the plasmon generator 16, the waveguide 17 and the like are formed on a substrate 3.

The laser light emitted from the laser diode unit 31 propagates through the waveguide 17. In the waveguide 17, the above-described polarization converter 80 is provided.

The magnetic recording element 5 may have the magnetic pole 10 for perpendicular magnetic recording. The magnetic pole 10 may be formed from, for example, FeCo. The magnetic pole 10 is adjacent to the plasmon generator 16. A front end portion 10a of the magnetic pole 10 is positioned on the air bearing surface S, and generates a magnetic field for recording at the air bearing surface S.

In the vicinity of the magnetic pole 10, a return shield layer 11 is provided. The return shield layer 11 may be formed from metal. Around the magnetic pole 10, coils 13a, 13b are wound around a contact part 12. By a current flowing through the coils 13a, 13b, magnetic flux is induced in the magnetic pole 10. The magnetic flux generated in the magnetic pole 10 is emitted from the front end portion 10a of the magnetic pole toward the magnetic recording medium 262.

The magnetic flux emitted from the front end portion 10a of the magnetic pole enters the magnetic recording medium 262 and magnetizes each bit of the recording medium 262 in a perpendicular direction (y direction in the drawing). By controlling orientation of the magnetic flux emitted from the magnetic pole 10, any magnetic information can be written to each bit of the recording medium 262. The magnetic flux emitted from the magnetic pole 10 passes through the magnetic recording medium 262 and is absorbed by the return shield layer 11 of the magnetic head 1.

The laser diode unit 31 is positioned on a side opposite to the air bearing surface S of the slider 210. The laser diode unit 31 is provided with a laser diode 32 and a submount 33 mounting the laser diode 32. The submount 33 may be formed from a silicon substrate. The submount 33 may be soldered to the slider 210 by a bonding layer 37.

The waveguide 17 includes the core part 15 that propagates the laser light generated by the laser diode unit 31 as propagation light 40, and the cladding part 18 that covers the core part 15. The refractive index of the cladding part 18 is smaller than the refractive index of the core part 15. The core part 15 can be formed from, for example, silicon dioxide ($SiO_2$) and alumina ($Al_2O_3$). The cladding part 18 can be formed from, for example, tantalum oxide, titanium oxide, and the like.

The laser diode 32 emits laser light toward the core part 15 of the waveguide 17 of the slider 210 in a direction perpendicular to the air bearing surface S. From a manufacturing point of view, a common laser diode 32 often emits laser light of the TE polarization. However, in order to excite surface plasmons of a propagation type, it is necessary to apply an incident light of the TM polarization to the plasmon generator 16. Therefore, the laser light of the TE polarization is converted by the polarization converter 80 to laser light of the TM polarization. The laser light converted to the TM polarization propagates through the waveguide 17 toward a front end portion (a portion close to the air bearing surface S) of the waveguide 17.

The plasmon generator 16 is adjacent to the waveguide 17 in the vicinity of the air bearing surface S (see FIGS. 8 and 9). The plasmon generator 16 is provided between the magnetic pole 10 and the waveguide 17 and is close to the front end portion 10a of the magnetic pole 10.

In the example illustrated in FIG. 9, the plasmon generator 16 opposes the front end portion 17a of the waveguide 17 at a predetermined spacing. Between the plasmon generator 16 and the waveguide 17, a buffer part 20 having a refractive index lower than the refractive index of the waveguide 17 is provided. The buffer portion 20 functions to cause the laser light propagating though the waveguide 17 to couple with the plasmon generator 16 in a surface plasmon mode.

The plasmon generator 16 couples in the surface plasmon mode with the propagation light 40 that propagates through the core part 15 and generates surface plasmons. Specifically, based on an optical interface condition of the core part 15 and the buffer part 20, evanescent light is excited in the buffer part 20. The evanescent light excites surface plasmons (in the present example, surface plasmon polariton) on a metallic surface of the plasmon generator 16. The surface plasmons propagate toward a front end portion of the plasmon generator 16 and generate near-field light at the front end portion (air bearing surface S) of the plasmon generator 16. The plasmon generator 16 can be formed with any material, typically metal, that can received the evanescent light to generate surface plasmons.

The near-field light generated at the front end portion of the plasmon generator 16 reaches the surface of the magnetic recording medium 262 and heats a specified bit of the magnetic recording medium 262. An anisotropy field (coercive force) of the heated bit is reduced. Therefore, the orientation of the magnetization of this bit can be easily changed. Therefore, while locally heating a recording region, that is, a specified bit, by applying a writing magnetic field radiated from the magnetic pole 10 to the bit, magnetic information can be easily recorded. The near-field light has an advantage that allows a local region, in particular, a region smaller than the wavelength of the light, to be selectively heated. Further, without directly irradiating the plasmon generator 16 with the electromagnetic wave propagating through the waveguide 17, by using the evanescent light that exudes from the waveguide 17, excessive heat generation in the plasmon generator 16 can be prevented.

Here, an example of a configuration of the slider 210 or the magnetic head 1 that is provided with the polarization converter 80 is explained. However, the slider 210 and the magnetic head 1 may adopt any configuration. Further, the polarization converter 80 of the present invention is not limited to the slider 210 or the magnetic head 1, but is applicable to anything that has a function to convert the polarization state of the electromagnetic wave.

Figure 10:
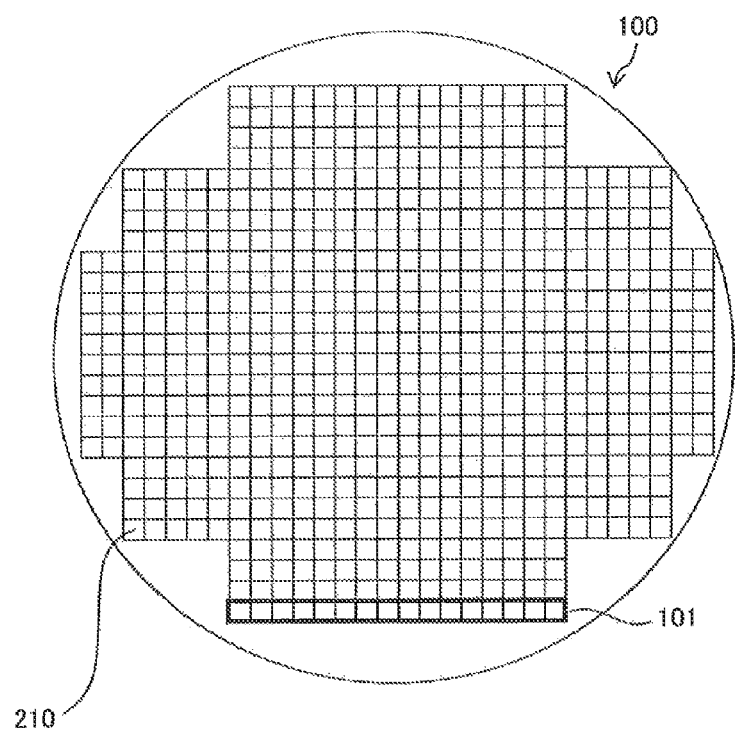
FIG. 10 is a plan view of a wafer for manufacturing sliders.

Next, a wafer used in manufacturing of the above-described magnetic head 1 or the slider 210 is explained. Referring to FIG. 10, at least the above-described slider 210 is film-formed in a wafer 100. The wafer 100 is divided into a plurality of bars 101, which are processing units when polishing processing the air bearing surface. The bar 101 is further cut after the polishing processing, and is separated into respective sliders 210. Margins for cutting (not illustrated) that are for cutting the wafer 100 into the bars 101 and the bars 101 into the sliders 210 are provided in the wafer 100.

Figure 11:
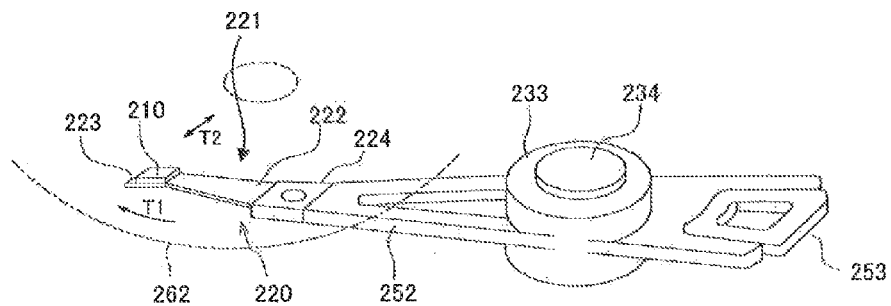
FIG. 11 is a perspective view of a head arm assembly containing a head gimbal assembly that incorporates a slider.

Referring to FIG. 11, a head gimbal assembly 220 is provided with the slider 210 and a suspension 221 elastically supporting the slider 210. The suspension 221 has a load beam 222, a flexure 223, and a base plate 224. The load beam 222 is formed of for example, stainless steel and has a shape of a plate spring. The flexure 223 is provided on the load beam 222. The base plate 224 is provided on the other end of the load beam 222. The flexure 223 is joined to the slider 210 to provide an appropriate degree of freedom to the slider 210. A gimbal part for keeping a posture of the slider 210 constant is provided on a portion of the flexure 223 on which the slider 210 is mounted.

The slider 210 opposes the hard disk 262 that is a recording medium of a discotic shape and is rotatably driven. When the hard disk 262 rotates in a T1 direction in FIG. 11, air flow passing between the hard disk 262 and the slider 210 generates a lifting force downward on the slider 210. The slider 210 flies from the surface of the hard disk 262 due to the lifting force.

An assembly in which the head gimbal assembly 220 is mounted on an arm 252 is referred to as a head arm assembly. The arm 252 moves the slider 210 in a T2 direction (track width direction) of FIG. 11. This allows the slider 210 to move from a specified track of the hard disk 262 to another track.

One end of the arm 252 is mounted on the base plate 224. On the other end part of the arm 252, a coil 253 that forms a part of a voice coil motor is mounted. A bearing part 233 is provided in a middle portion of the arm 252. The arm 252 is rotatably supported by a shaft 234 that is provided on the bearing part 233. The voice coil motor, which drives the arm 252, and the arm 252 configure an actuator.

Figure 12:
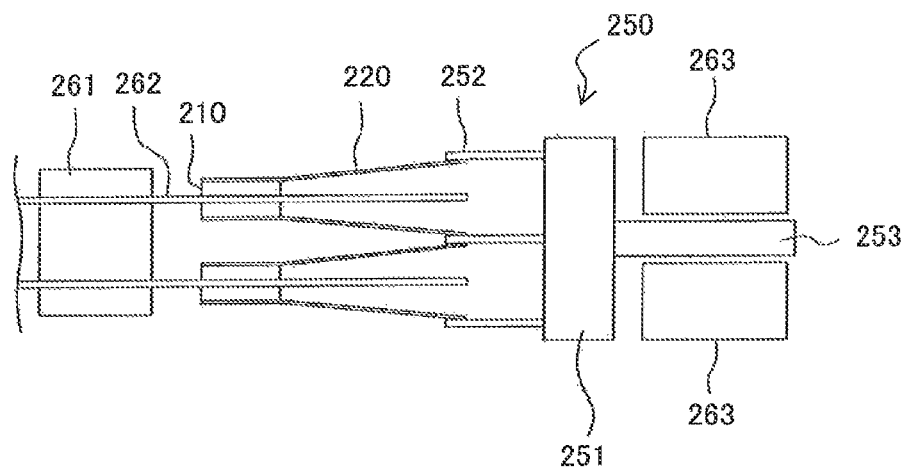
FIG. 12 is a side view of a head stack assembly that incorporates a slider.
Figure 13:
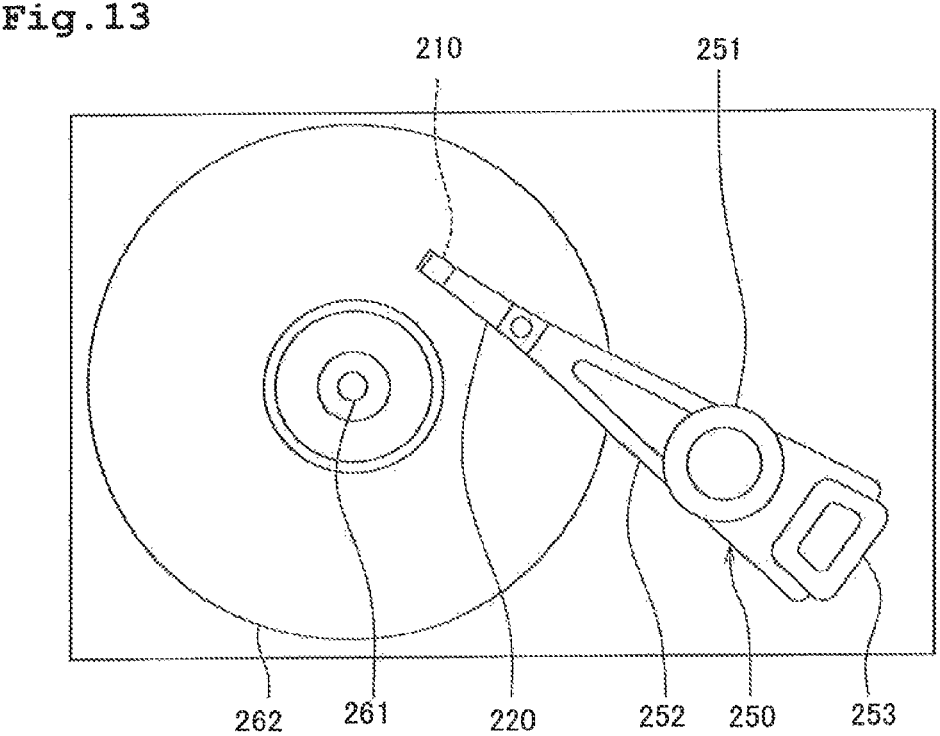
FIG. 13 is a plan view of a hard disk drive apparatus that incorporates a slider.

Next, referring to FIGS. 12 and 13, a head stack assembly, in which the above-described slider 210 is incorporated, and a hard disk drive apparatus are explained. The head stack assembly is an assembly in which the head gimbal assembly 220 is mounted on each arm 252 of a carriage 251 that has a plurality of arms 252. FIG. 12 is a side view of the head stack assembly. The head stack assembly as a positioning device 250 has the carriage 251 that has the plurality of the arms 252. The head gimbal assemblies 220 are respectively mounted on the arms 252 in a manner to align themselves in the perpendicular direction at intervals from each other. On an opposite side of the arm 252 of the carriage 251, the coil 231 that forms a part of the voice coil motor is mounted. The voice coil motor has permanent magnets 263 that oppose each other across the coil 251.

Referring to FIG. 13, the head stack assembly 250 is incorporated into the hard disk drive apparatus. The hard disk drive apparatus has a plurality of the hard disks 262 mounted on a spindle motor 261. On each hard disk 262, two sliders 210 are arranged in a manner opposing each other across the hard disk 262. The head stack assembly 250, excluding the slider 210, and the above-described actuator correspond to the positioning device, support the slider 210, and position the slider 210 with respect to the hard disk 262. The slider 210 is moved by the actuator in the track width direction of the hard disk 262 and is positioned with respect to the hard disk 262. The magnetic head 1 contained in the slider 210 uses the recording head part to record information to the hard disk 262, and uses the reading head part to read the information recorded in the hard disk 262.

A preferred embodiment of the present invention is presented and explained in detail. However, it is to be understood that, without departing from the spirit or scope of the appended claims, various changes and modifications are possible.

What is claimed is:

1. A polarization converter comprising:
a core part that wave-guides an electromagnetic wave; and
a cladding part that is provided around the core part, wherein
the core part comprises a conversion part converting a polarization state of the electromagnetic wave, and
a cross-sectional shape of the conversion part in a plane orthogonal to a propagation direction of the electromagnetic wave is a shape formed by cutting off a portion of a rectangular or square shape along a jagged diagonal line.

2. The polarization converter according to claim 1, wherein arithmetic mean roughness of the jagged diagonal line is 1 nm or more and 21 nm or less.

3. The polarization converter according to claim 1, wherein a contour of the conversion part comprises, in a cross section orthogonal to the propagation direction of the electromagnetic wave, a linear horizontal side, a linear vertical side orthogonal to the horizontal side, and the jagged diagonal line.

4. The polarization converter according to claim 1, wherein the conversion part has a cross section of a substantially right-angled triangular shape formed by the linear horizontal side, the linear vertical side and the jagged diagonal line.

5. A thermally-assisted magnetic recording head comprising:
a waveguide through which an electromagnetic wave propagates;
a polarization converter according to claim 1 provided in the waveguide; and
a plasmon generator that couples in a plasmon mode with light passing through the polarization converter and generates near-field light.

6. The thermally-assisted magnetic recording head according to claim 5, further comprising:
a magnetic pole that generates a writing magnetic field.

7. A slider comprising:
a waveguide through which an electromagnetic wave propagates;
a polarization converter according to claim 1 provided in the waveguide; and
a plasmon generator that couples in a plasmon mode with light passing through the polarization converter and generates near-field light.

8. A wafer comprising a slider according to claim 7.

9. A head gimbal assembly comprising:
a slider according to claim 7; and
a suspension elastically supporting the slider.

10. A hard disk drive apparatus comprising:
a slider according to claim 7; and
a device that supports the slider and positions the slider with respect to a recording medium.

* * * * *